UNITED STATES PATENT OFFICE 2,060,192

CORROSION INHIBITOR

Walter Villa Gilbert, London, England

No Drawing. Application July 16, 1934, Serial No. 735,516. In Great Britain July 20, 1933

3 Claims. (Cl. 23—239)

This invention relates to methods of manufacturing metallic chromates and it has for its object to provide an improved product for the purpose of preventing corrosion, said product being obtained by neutralizing with caustic potash a solution of zinc chromate in chromic acid. It is not merely zinc chromate as would be expected, but is a complex potassium-zinc chromate which is especially useful for preventing corrosion.

One of the uses of sparingly soluble chromates is their application to the preparation of corrosion inhibiting protective agents, and in such applications it is of primary importance that the chromates shall contain no constituents as would nullify the passifying quality of the chromates per se, whereas other inert impurities such as silicates, oxides, etc., do not interfere with the anti-corrosive action of metallic chromates. The principal impurities which nullify passifying qualities of chromates are chlorides, sulphates and nitrates which have been found, even in products sold as pure chromates, in quantities sufficient to interfere with the anti-corrosive action of these compounds.

By a proper selection of raw materials and reagents used the process of the invention enables chromate material to be prepared which is either entirely free from these deleterious impurities or in which such impurities are not present in quantities greater than, in the case of chlorides, 0.02 per cent.

According to the invention the process for preparing zinc chromate material comprises the step of precipitating the required metal chromate from a chromic acid solution thereof by neutralizing free chromic acid therein by means of caustic potash.

The improved process may be carried out as follows:—

There is first prepared a solution of an oxide, hydroxide or carbonate of the metal of which the chromate is required in a solution of chromium trioxide in water, the chromium trioxide being used preferably in such excess proportions as will produce a substantially clear solution of chromate or chromates, which may be subsequently filtered as desired. To the filtered solution an alkali alone or an alkali mixed with soluble chromates is added, the mixture being stirred to the required extent; during this part of the process the desired metallic chromate will be precipitated and under predeterminable conditions of alkalinity or acidity. The invention is applicable in particular to the preparation of the chromate of zinc.

The metal compounds used for the preparation of the chromate need not essentially be in a pure condition as properly or ordinarily understood, provided always that no harmful materials enter the final product. Natural carbonates of the various metals may be successfully employed within these limitations.

The following example illustrates the carrying out of the invention:—

Twenty grammes of zinc oxide are mixed with eighty c.cs. of water to form a paste. To this paste there is added with heating and stirring one hundred and ten c.cs. of a solution of chromium trioxide in water, the solution containing fifty grammes of chromium trioxide per hundred c.cs. of solution. After filtering there is added as may be necessary to the clear solution two hundred c.cs. of another solution consisting of caustic potash in water containing twenty gr. of caustic potash per one hundred c.cs. of solution. The precipitated zinc chromate is filtered off, washed with water and allowed to dry. The precipitate will not necessarily consist solely of the normal chromate of zinc ($ZnCrO_4$) but may contain, even after washing, some amount of potassium chromate associated with it, but this, especially where the chromate is to be used as an anti-corrosion material will be an advantage rather than otherwise. Nevertheless this potassium chromate may be, if required, eliminated by any suitable means.

In order to facilitate the dispersion of the finished chromates in oils, emulsifying agents and protective colloids may be incorporated with the finished product prior to drying.

What I claim is:—

1. A corrosion inhibiting composition comprising the precipitated product obtained when a solution of zinc chromate in chromic acid is neutralized by the addition thereto of caustic potash.

2. A corrosion inhibiting composition comprising the precipitated product obtained by adding to chromium trioxide, a paste consisting of zinc oxide and water, filtering the resultant solution and then precipitating the said product by the addition of caustic potash solution.

3. A corrosion inhibiting composition comprising the product obtained by mixing 20 gms. of zinc oxide with 80 c.cs. of water, adding thereto 10 c.cs. of chromium trioxide solution containing 5 gms. chromium trioxide, filtering and then obtaining the said product as a precipitate by adding to the filtrate, 200 c.cs. of caustic potash solution containing 40 gm. of caustic potash.

WALTER VILLA GILBERT.